Feb. 17, 1970                V. T. STACK, JR                3,496,084
             DISSOLVED OXYGEN PROBE AND AGITATOR ASSEMBLY
Filed Nov. 21, 1967                                 2 Sheets-Sheet 1

INVENTOR.
VERNON T. STACK, Jr

BY

Paul + Paul
ATTORNEYS.

Feb. 17, 1970  V. T. STACK, JR  3,496,084
DISSOLVED OXYGEN PROBE AND AGITATOR ASSEMBLY
Filed Nov. 21, 1967  2 Sheets-Sheet 2

INVENTOR.
VERNON T. STACK, JR.

BY

Paul & Paul
ATTORNEYS.

United States Patent Office 3,496,084
Patented Feb. 17, 1970

3,496,084
DISSOLVED OXYGEN PROBE AND AGITATOR ASSEMBLY
Vernon T. Stack, Jr., Chadds Ford, Pa., assignor to Weston and Stack, Inc., West Chester, Pa., a corporation of Pennsylvania
Filed Nov. 21, 1967, Ser. No. 684,805
Int. Cl. G01n 27/54, 27/46
U.S. Cl. 204—195
8 Claims

ABSTRACT OF THE DISCLOSURE

A dissolved oxygen probe and cleaner-agitator assembly is disclosed for determining the quantity of molecular oxygen in most gases or liquids, especially polluted or clear water. The apparatus is designed for use as a continuous monitoring system, and as such is submerged in the water for long periods of time. The anode of the probe is a large quantity of lead wire; the cathode is a platinum tip; the electrolyte is preferably potassium iodide; the membrane is selectively permeable to oxygen and other gases but is impermeable to the organic or inorganic constituents of the sample. The membrane is a type of plastic, preferably Teflon, a synthetic resin based on tetrafluoroethylene polymers. A thermistor assembly is provided in an active temperature circuit for compensation of the probe output. A motor driven agitator or impeller is provided for moving the liquid past the probe tip to continually present a fresh sample thereto. The same motor drive also drives a rotating brush or wiper which is in engagement with the membrane-covered probe tip and keeps the membrane clean of contaminate. The motor drive is housed in a water-tight cannister below the submerged probe, and the motor output is magnetically coupled to the cleaner-agitator system.

FIELD OF THE INVENTION

This invention relates to electro-chemical cells which are used with external electrical circuitry and in meters for measuring oxygen concentrations in polluted water and other fluids.

DESCRIPTION OF THE PRIOR ART

The prior art includes such patents as Clark 2,913,386; Carritt et al. 3,000,805; Beebe et al. 3,098,813; Okun et al. 3,227,643; Heldenbrand 3,239,444; Leonard et al. 3,278,408; and Mackereth 3,322,662. These patents are found in class 204, sub-class 195.

SUMMARY OF THE INVENTION

The invention is directed to a monitoring sampler in combination with a dissolved oxygen probe designed for monitoring purposes wherein the probe is left in the polluted water (or other liquid) for long periods of time, as for example, from six to eight weeks. To provide for electro-chemical reaction over long periods of time, the lead anode is a large quantity of coiled lead wire. It also becomes necessary to provide some means for keeping the oxygen-permeable membrane, which covers the platinum cathode tip, clean and free of contaminants and soil which would otherwise tend to cling to the surface of the tip of the probe. For this purpose, the present invention provides a motor-driven cleaner and agitator. The cleaner is in the form of a blade wiper, preferably of Teflon, which is in engagement with the oxygen-permeable membrane at the tip, and is driven rotationally to keep the tip clean while at the same time providing adequate exposure of the tip to the polluted water whose oxygen content is to be measured. Combined with the rotating wiper is an impeller or agitator so designed as to drive the water radially outward and upward past the tip of the probe, thereby to continually present a new sample to the probe.

DESCRIPTION OF THE PREFERRED EMBODIMENTS

DESCRIPTION OF THE PREFERRED EMBODIMENT

Figure 1:
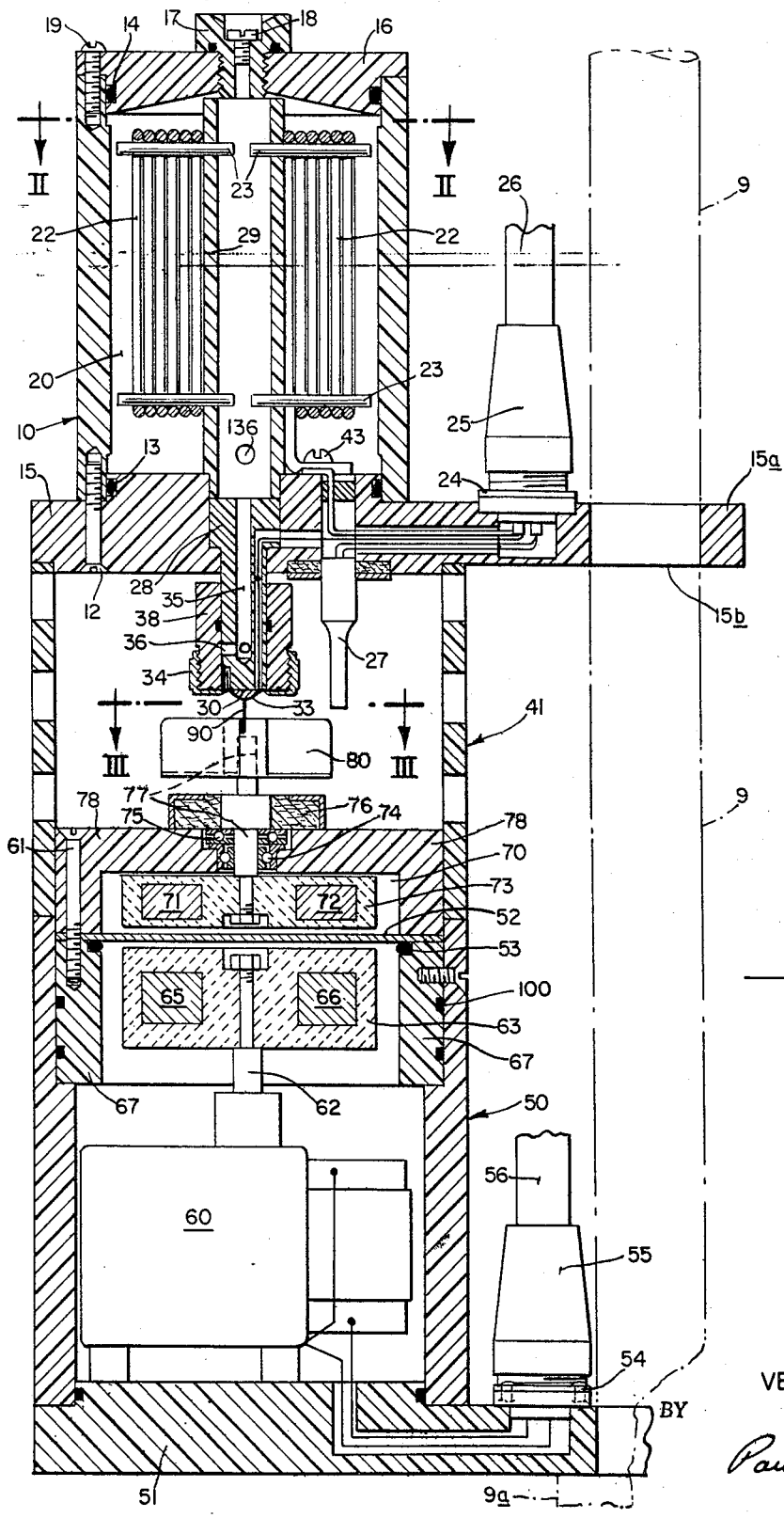
FIG. 1 is an elevational view, in section, showing the probe and cleaner-agitator.
Figure 2:
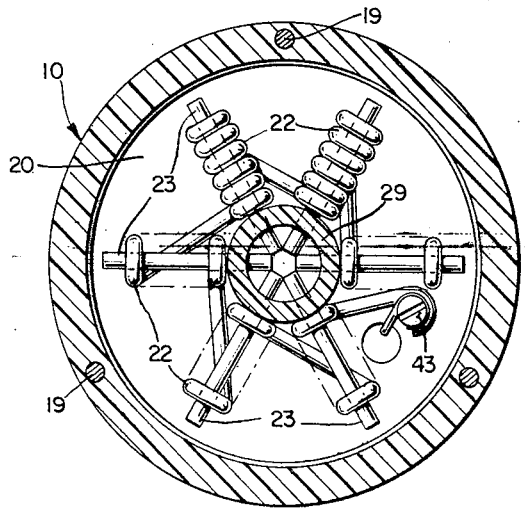
FIG. 2 is a plan view looking down along the lines II—II of FIG. 1 showing a cross section of the large-area lead anode wire in the electrolyte chamber.
Figure 3:
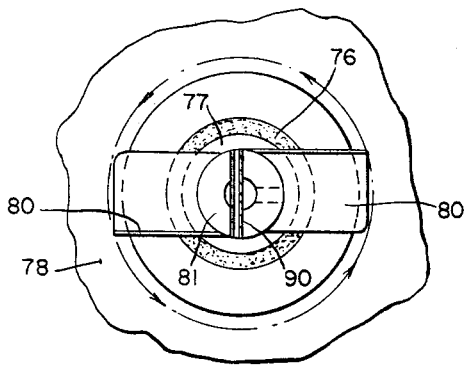
FIG. 3 is a plan view looking down along the lines III—III of FIG. 1 showing the impeller vane.
Figure 4:
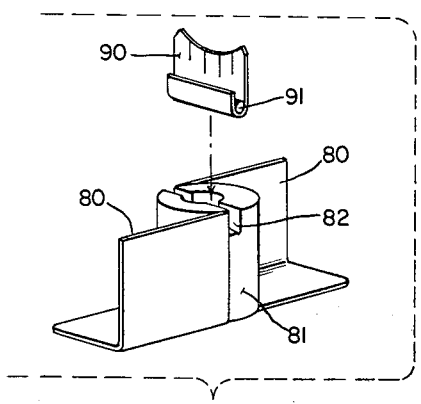
FIG. 4 is a perspective view of the impeller and of the wiper blade which is carried by the hub of the impeller.

Referring now to the drawing and particularly to FIG. 1, the probe-cleaner-agitator device of the present invention is designed for either partial or complete submersion and is shown to comprise a watertight upper cannister 10, a perforated intermediate casing 41 and a watertight lower cannister 50 held together by tie rods not shown. Each of the cannisters is of generally cylindrical configuration, and each is formed of chemical resistant material, preferably polyvinylchloride or epoxy. The upper cannister 10 is supported on and secured by screws 12 to a mounting plate 15, preferably of polyvinylchloride or epoxy, and sealed as by O-ring 13. The top end of cannister 10 is closed by a cap 16, preferably of polyvinylchloride or epoxy, sealed by O-ring 14, and secured as by screws 19. Cap 16 has a central fill screw 17 having an O-ring seal and a plug 18. The mounting plate 15 extends laterally to one side, and the lateral extension 15a has therethrough a circular hole 15b through which is passed the carrier pole or pipe 9, which is the normal way for supporting the device.

The lower cannister 50 is mounted on and secured by screws (not shown) to a lower mounting plate 51, which has a lateral extension and a circular pipe hole therethrough corresponding to and in alignment with the lateral extension and pipe hole of the upper mounting plate 15. Lack of room on the drawing prevents full illustration of the lateral extension of the lower mounting plate. The pipe 9 has at its lower end a flange 9a on which the device rests. The pipe 9 extends upwardly to above the surface of the water where it is secured to a suitable mounting, not shown. Alternatively, in lieu of supporting the device on a pipe or pole 9, the device may be provided with a hanger strap and suspended from a hook.

The lateral extension 15a of the upper mounting plate 15 carries a waterproof receptacle or socket 24 for receiving the plug 25 at the terminal end of a cable 26. Similarly, the lateral extension of the lower casing carries a waterproof receptacle or socket 54 for receiving the plug 55 at the terminal end of a cable 56.

Supported within the lower cannister 50 is a motor drive 60 comprising a motor, reduction gearing, and a capacitor, having leads extending to the receptacle 54. Mounted on the motor shaft 62, and secured thereto as by a nut, is an epoxy disc 63 carrying the ceramic bar magnets 65 and 66. Secured, as by screws, to the inner wall of the upper portion of the cannister 50 is an annular body 67 which supports thereabove a steel separator plate 52 which functions, together with O-rings 53 and 100 to close the lower cannister 50 to prevent entry of water thereinto. Supported on plate 52 and on annular body 67, and secured thereto, as by screws 61, is a circular plate 78 having a peripheral flange which projects downwardly therefrom, forming a chamber 70 within which is supported for rotation an epoxy disc 73 having imbedded therein the bar magnets 71 and 72. The disc 73 is mounted on a shaft 77 which is supported in the plate 78 and journalled for rotation by the two radial bearings 74 and the thrust bearing 75. A felt seal 76 is provided to prevent the entry of grit into the bearings along the shaft 77.

The shaft 77 also projects upwardly, and adjustably mounted thereon, above the seal 76, is an impeller vane 80 having a cylindrical hub portion 81 having a slot 82 therein which receives the lower portion of a Teflon blade wiper 90. The wiper 90 is held in the slot 82 by the compressible cylindrical wedge 91 or other suitable means. The upper portion of wiper 90 is cut longitudinally, forming individual wiper fingers and the upper edge of the wiper 90 has a concave configuration of a size and shape which adapts the wiper to mate with the convex-rounded membrane-covered platinum cathode tip 30 of the probe, hereinafter described, so that rotation of the shaft 77 and of the wiper 90 maintains the oxygen permeable membrane 33 which covers the platinum cathode 30 clean and free of soils and contaminants which may adhere to the said membrane.

Figure 5:
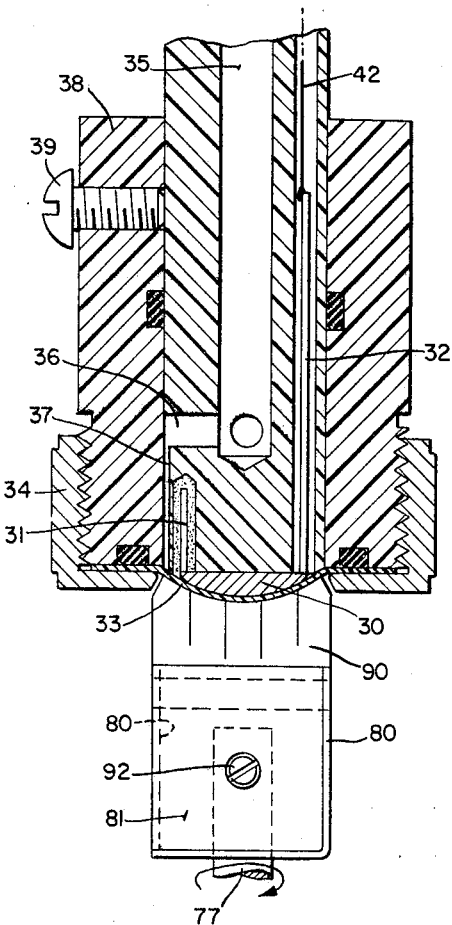
FIG. 5 is an enlarged view, in section, of the probe tip and wiper.

The dissolved oxygen probe is carried by the upper cannister 10. The tip portion of the probe extends downwardly below cannister 10 into the perforated casing 41 and includes a cathode adapted 28 which has an enlarged head portion which is supported by a shoulder in mounting plate 15. The cathode adapter 28 is provided with a center cavity 35, which terminates short of the tip, and a radial passage 36, seen in FIG. 5, which provides communication between cavity 35 and a slot 37 which extends downwardly along the outside of the adapted 28 to the platinum cathode tip 30.

The perforated casing 41, held clamped between the upper and lower cannisters 10 and 50, allows the liquid to reach the oxygen-permeable-membrane-covered cathode tip while at the same time protecting the cathode tip assembly from damage by large objects.

Figure 6:
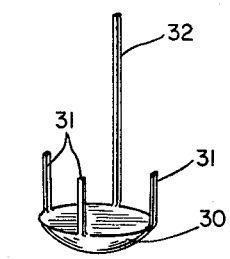
FIG. 6 is a detailed view of the platinum cathode tip.

The platinum cathode cap 30, shown alone in FIG. 6, is covered by a membrane 33 selectively permeable to oxygen and other gases but impermeable to the other elements of the polluted water or other liquid. In the form shown in the drawing, the membrane 33 is a thin disc of plastic, preferably Teflon, a synthetic resin based on tetrafluoroethylene polymers. The membrane is inserted into the base of a clamp nut 34, and the nut is screwed on to a membrane adapter 38 which covers the lower end portion of the cathode adapter 28. A set screw 39 secures the adapter 38 to the adapter 28. The cap end of clamp nut 34 is annular, having a central aperture through which protrudes the platinum cap 30 and its Teflon membrane covering.

As indicated previously, the dissolved oxygen probe of the present application is particularly designed for monitoring service which requires submersion and electrochemical action of the probe for long periods of time. To provide for the extended period of electro-chemical action, the anode of the probe is required to have a large area, and in the present application this requirement is met by employing a long continuous length (for example twelve feet) of lead wire 22 looped about upper and lower tree rods 23. The tree rods 23 are press fitted into holes in a cylindrical tree pipe 29 which is located on the center axis of the upper cannister 10 and extends between the cap 16 and the mounting plate 15. Six upper and six lower tree rods 33 are shown on 60° spacing. Each tree carries a number of loops of lead anode wire. One end of the lead anode wire 22 is connected to a terminal 43 which is connected by a conductor to the receptacle 24.

The interior 20 of the upper cannister 10 is filled, by way of the fill screw 17, the pipe 29, and passage 136, with a suitable electrolyte, preferably potassium iodide, to a level sufficiently high to cover the lead wire anode. Contact of the electrolyte with the platinum cathode tip is made by way of the cavity 35 in the adapter 28, the passage 36, and the slot 37. Through this route, the electrolyte connects the lead wire anode with the platinum cathode. The electrolyte flows down the slot 37 and into the narrow space between the outer surface of the platinum cathode cap 30 and the inner surface of the oxygen permeable membrane 33.

To keep the surface of the membrane 33 clean and free of obstruction to the passage of molecular oxygen therethrough, the wiper 90 is so located that its arcuate upper edge, which conforms in curvature to platinum cap 30, rests lightly against the membrane 33. As previously indicated, both the wiper 90 and the membrane 33 are preferably of Teflon. Adjustment of the wiper 90 vertically is made by adjusting vertically on shaft 77 the impeller hub 81 which carries the wiper 90 in the slot 82. A set screw 92 is provided for this purpose.

The wiper 90 is driven rotationally by the motor drive 60 which receives power through the cable 56, plug 55 and receptacle 54, all of the latter being waterproof. Motor drive 60 drives the shaft 62 which carries the lower magnetic disc 63. Rotation of disc 63 causes rotation of upper disc 73 through magnetic induction. Upper disc 73 is carried on the lower portion of shaft 77, the upper portion thereof carrying the impeller hub 81, the impeller vanes 80 and the wiper 90.

The functions of the vanes 80 are to move the water (or other liquid) up past the probe tip so as to continually present fresh samples to the probe, and also to prevent entrapment of air or gas bubbles on the membrane-covered cathode tip. For these purposes, the opposing blades of the vane 80 may be slightly canted so as to produce a flow that is not only upward but also radially outward from the center axis of the shaft. The angular spacing between the opposed blades of the impeller or agitator vane 80 is preferably less than 180° but greater than 160°.

It will be understood that one of the problems to be solved was that of maintaining the exposed surface of the oxygen permeable membrane 33 clean without imposing undue obstruction to the flow of polluted water over the surface of the membrane, so as not to interfere with the passage of oxygen therethrough, and without causing excessive wear of the membrane. This is achieved, in accordance with the present invention, by providing a narrow or blade form of wiper which has a lateral cross-section corresponding to that of a narrow vertical slice of the spherical-segment platinum cap 30, and which has an upper edge contour corresponding to that of the surface of the platinum cap, and by so mounting the wiper for rotation about the vertical axis of the probe that the contoured edge of the wiper lightly engages the oxygen permeable membrane cover of the platinum cap. Preferably, the contoured edge portion of the wiper is slit vertically at intervals, forming a series of wiper fingers.

While the preferred embodiment of this invention has been described in some detail, it will be obvious to one skilled in the art that various modifications may be made without departing from the invention as hereinafter claimed.

What is claimed is:

1. A dissolved oxygen probe and cleaner-agitator assembly adapted to be partly or totally submerged for continuous operation in liquids, said assembly comprising:

(a) a dissolved oxygen probe comprising a first watertight housing having an anode therein and adapted to contain an electrolyte, and a cathode of spherical-segment configuration protruding from said housing, (b) an oxygen permeable membrane covering said cathode, (c) a wiper having an edge contoured to mate with a narrow vertical sectional slice of said membrane covering said cathode,
(d) a shaft mounted for rotation below said cathode and carrying said wiper,
(e) means for driving said wiper shaft rotationally to cause said wiper to wipe rotationally about the surface of said membrane,
(f) said means for driving said wiper shaft including a motor drive and a second water-tight housing for said motor drive.

2. Apparatus according to claim 1 characterized in that an agitator vane is combined with said wiper for propelling said liquid past said membrane.

3. A dissolved oxygen probe and cleaner-agitator assembly adapted to be partly or totally submerged for continuous operation in liquids, said assembly comprising:
 (a) a dissolved oxygen probe comprising a first water-tight housing having an anode therein and adapted to contain an electrolyte, a cathode tip of spherical-segment configuration protruding from said housing, and an oxygen selectively permeable membrane covering said tip,
 (b) a wiper having an edge contoured to mate with a narrow vertical sectional slice of said membrane-covered cathode tip and in contact with said membrane,
 (c) a shaft mounted for rotation below said cathode tip and carrying said wiper,
 (d) means for driving said wiper shaft rotationally,
 (e) said wiper having an agitator vane carried on said shaft below said wiper for causing flow of said liquid past said cathode tip,
 (f) said drive means for driving said wiper shaft rotationally including a motor drive and a second water-tight housing,
 (g) said drive means also including a magnetic drive a portion of which is within and the remaining portion of which is outside said second water-tight housing.

4. Apparatus according to claim 3 characterized in that said anode is a lead wire of substantial length formed into a plurality of loops, and in that said cathode tip is a platinum cap.

5. Apparatus according to claim 4 characterized in that both said oxygen-selectively-permeable membrane and also said wiper are made of plastic.

6. Apparatus according to claim 5 characterized in that said agitator vane comprises a pair of opposed radially disposed blades, the angle between said blades being less than 180° but greater than 160° for causing an upward outward flow of liquid past said cathode tip.

7. Apparatus according to claim 6 characterized in that a perforated casing is disposed between said first and second water-tight housings for allowing said liquid to reach the oxygen permeable membrane covering the cathode tip while at the same time protecting the cathode tip assembly from damage by large objects.

8. A dissolved oxygen probe and cleaner-agitator assembly adapted to be partly or totally submerged for continuous operation in liquids, said assembly comprising:
 (a) a dissolved oxygen probe comprising a first water-tight housing having an anode, a cathode of decreasing diameter, and an oxygen permeable membrane covering said cathode,
 (b) an agitator having a wiper portion having an edge contoured to correspond with the surface of a narrow vertical sectional slice of said membrane covering said cathode, said wiper edge being disposed in wiping proximity to said membrane,
 (c) a support member for said agitator and wiper mounted below said cathode and carrying said agitator and wiper at its upper end,
 (d) means for driving said support member to wipe said membrane with a generally horizontal movement and to propel said liquid past said membrane,
 (e) said drive means for driving said support member including a motor and a second water-tight housing for said motor,
 (f) said drive means also including a drive shaft and a seal therefor.

References Cited

UNITED STATES PATENTS

| | | | |
|---|---|---|---|
| 1,668,434 | 5/1928 | Todd | 204—195 |
| 3,073,772 | 1/1963 | Wirz et al. | 204—195 |
| 3,155,603 | 11/1964 | Hart | 204—195 |
| 3,235,477 | 2/1966 | Keyser et al. | 204—195 |
| 3,275,541 | 9/1966 | Strong | 204—195 |
| 3,402,116 | 9/1968 | Kaltenhauser et al. | 204—195 |

FOREIGN PATENTS 695,776  8/1953  Great Britain.

T. TUNG, Primary Examiner

U.S. Cl. X.R.
204—279